(12) United States Patent
Horitake et al.

(10) Patent No.: US 10,601,230 B2
(45) Date of Patent: *Mar. 24, 2020

(54) ELECTRIC POWER SUPPLY SYSTEM FOR VEHICLE

(71) Applicant: TOYOTA JIDOSHA KABUSHIKI KAISHA, Toyota-shi, Aichi-ken (JP)

(72) Inventors: Sunao Horitake, Toyota (JP); Hiroshi Nate, Nagoya (JP); Yasuharu Terada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,134

(22) Filed: Oct. 5, 2018

(65) Prior Publication Data
US 2019/0044344 A1    Feb. 7, 2019

Related U.S. Application Data

(63) Continuation of application No. 15/453,389, filed on Mar. 8, 2017, now Pat. No. 10,135,264.

(30) Foreign Application Priority Data

Mar. 10, 2016   (JP) .................................. 2016-047028

(51) Int. Cl.
*H02J 7/00* (2006.01)
*H02J 7/14* (2006.01)
(Continued)

(52) U.S. Cl.
CPC ............ *H02J 7/0004* (2013.01); *B60L 58/12* (2019.02); *B60L 58/16* (2019.02); *B60L 58/20* (2019.02);
(Continued)

(58) Field of Classification Search
CPC ...... H02J 7/0004; H02J 7/0068; H02J 7/1423; H02J 7/1453; H02J 7/1492; H02M 3/04; B60R 16/033
USPC ........................................................ 320/109
See application file for complete search history.

(56) References Cited

U.S. PATENT DOCUMENTS 6,232,750 B1 * 5/2001 Podrazhansky ....... H02J 7/0093
320/139
6,339,264 B1 * 1/2002 Wang .................... H02J 7/0047
307/132 E
(Continued)

FOREIGN PATENT DOCUMENTS

CN         105103404 A      11/2015
CN         204928276 U      12/2015
(Continued)

*Primary Examiner* — Nathaniel R Pelton
(74) *Attorney, Agent, or Firm* — Hunton Andrews Kurth LLP (57) ABSTRACT

An electric power supply system for a vehicle includes a first battery, a second battery connected in parallel with the first battery, a voltage sensor configured to detect a voltage value of the second battery, a current sensor configured to detect a current value of the second battery, an electronic control unit configured to make a voltage of the alternator fluctuate according to a predetermined voltage waveform, and calculate internal resistance of the second battery using the voltage value and the current value of the second battery respectively detected by the voltage sensor and the current sensor while the electronic control unit is making the voltage of the alternator fluctuate according to the predetermined voltage waveform.

8 Claims, 9 Drawing Sheets

(51) Int. Cl.
  *B60L 58/12*    (2019.01)
  *B60L 58/21*    (2019.01)
  *B60L 58/16*    (2019.01)
  *B60L 58/20*    (2019.01)
  *B60R 16/033*   (2006.01)
  *H02M 3/04*     (2006.01)

(52) U.S. Cl.
  CPC ............ *B60L 58/21* (2019.02); *B60R 16/033* (2013.01); *H02J 7/0068* (2013.01); *H02J 7/1423* (2013.01); *H02J 7/1453* (2013.01); *H02J 7/1492* (2013.01); *H02M 3/04* (2013.01); *B60L 2240/427* (2013.01); *B60L 2240/54* (2013.01); *B60L 2240/545* (2013.01); *B60L 2240/547* (2013.01); *B60L 2240/549* (2013.01); *Y02T 10/7005* (2013.01); *Y02T 10/92* (2013.01)

(56) References Cited

U.S. PATENT DOCUMENTS 7,626,394 B2 * 12/2009 Kimura ................ G01R 31/389
                                              324/427
2012/0169358 A1    7/2012 Ono
2016/0016483 A1    1/2016 Yasunori et al.
2017/0350946 A1 * 12/2017 Mukaitani ............ G01R 31/36

FOREIGN PATENT DOCUMENTS

| JP | 2009300318 A   | 12/2009 |
| JP | 2010-093875 A  | 4/2010  |
| JP | 2011061979 A   | 3/2011  |
| JP | 2012112866 A   | 6/2012  |
| JP | 2012-132726 A  | 7/2012  |
| JP | 2013253809 A   | 12/2013 |
| WO | 2011034060 A1  | 3/2011  |

* cited by examiner

| PARAMETER INFORMATION | |
| --- | --- |
| UPPER LIMIT VOLTAGE | 14.5V |
| LOWER LIMIT VOLTAGE | 12.5V |
| VOLTAGE FLUCTUATION RATE | 0.5V/sec |

ELECTRIC POWER SUPPLY SYSTEM FOR VEHICLE

CROSS-REFERENCE TO RELATED APPLICATION

This is a continuation application of U.S. patent application Ser. No. 15/453,389 filed Mar. 8, 2017, which claims priority to Japanese Patent Application No. 2016-047028 filed on Mar. 10, 2016, the entire contents of which all are incorporated herein by reference.

BACKGROUND

1. Field of the Disclosure

The present disclosure relates to an electric power supply system for a vehicle.

2. Description of Related Art

As an electric power supply system for a vehicle which supplies electric power to various electric loads (headlamp, air conditioner, audio, meter electric components, wiper, and the like) mounted in a vehicle, an electric power supply system for a vehicle in which two batteries are connected in parallel is known. In the electric power supply system for a vehicle, the two batteries connected in parallel are charged with electric power supplied from an alternator (in a hybrid vehicle or the like, a direct current to direct current converter). In the electric power supply system for a vehicle, in a case where a high load is applied to a first battery (for example, a lead battery) by operation of various electric loads, the supply of electric power is also performed from a second battery (for example, a nickel-hydrogen battery), whereby appropriate electric power is supplied to various electric loads. With this, it is possible to stabilize the supply of electric power to various electric loads.

Here, in the electric power supply system for a vehicle, a method of calculating internal resistance of the second battery is examined. In general, as a method of calculating internal resistance of a battery, for example, a method using voltage fluctuation and current fluctuation due to discharging of the battery at the time of electric load operation is exemplified (see Japanese Patent Application Publication No. 2012-132726 (JP 2012-132726 A) described below). According to the method using voltage fluctuation and current fluctuation at the time of electric load operation in this way, since a dedicated discharging circuit or the like is not required, it is advantageous in that it is possible to calculate the internal resistance of the battery at low cost.

SUMMARY

However, in a case where the method using voltage fluctuation and current fluctuation at the time of electric load operation is applied to calculation of the internal resistance of the second battery in the above-described electric power supply system for a vehicle, the result is as follows.

In general, voltage fluctuation and current fluctuation with operation of electric loads vary depending on a way of operation of the electric loads. For this reason, even in the second battery which supplies electric power along with the first battery with operation of the electric loads, similarly, voltage fluctuation and current fluctuation vary. As a result, even if the internal resistance of the second battery is calculated by the above-described method, high reproducibility is not obtained.

In addition, at the time of electric load operation, in general, a voltage fluctuation width is suppressed to be small by a voltage stabilization circuit or the like in order to stabilize the operations of the electric loads. For this reason, the voltage fluctuation width of the second battery which supplies electric power along with the first battery with operation of the electric loads is suppressed to be small. As a result, it is not possible to obtain a voltage fluctuation width required for calculating the internal resistance with satisfactory accuracy, and even if the internal resistance of the second battery is calculated by the above-described method, a high-accuracy calculation result is not obtained.

Accordingly, the disclosure provides an electric power supply system for a vehicle in which a first battery and a second battery are connected in parallel, having an advantage of calculating internal resistance of the second battery with high reproducibility and high accuracy.

A first aspect of the disclosure provides an electric power supply system including: a first battery connected to an alternator or a direct current to direct current converter and configured to be charged with electric power supplied from the alternator or the direct current to direct current converter and to supply electric power to an electric load mounted in a vehicle; a second battery connected to the alternator or the direct current to direct current converter, configured to be charged with electric power supplied from the alternator or the direct current to direct current converter, and connected in parallel with the first battery; a voltage sensor configured to detect a voltage value of the second battery; a current sensor configured to detect a current value of the second battery; and an electronic control unit including a central processing unit and configured to make a voltage of the alternator or the direct current to direct current converter fluctuate according to a predetermined voltage waveform; and calculate internal resistance of the second battery using the voltage value and the current value of the second battery respectively detected by the voltage sensor and the current sensor while the electronic control unit is making the voltage of the alternator or the direct current to direct current converter fluctuate according to the predetermined voltage waveform.

With this, the voltage of the alternator or the direct current to direct current converter fluctuates according to the predetermined voltage waveform, and it is possible to make voltage fluctuation in the second battery when calculating internal resistance more uniform than voltage fluctuation with operation of the electric load. Then, since it is possible to calculate the internal resistance of the second battery using the voltage value and the current value detected in a state where voltage fluctuation in the second battery is made uniform, it is possible to suppress variation in a calculation result compared to a case of calculating internal resistance using voltage fluctuation with operation of the electric load. That is, it is possible to realize high reproducibility in calculation of internal resistance.

In addition, since it is possible to make the voltage of the alternator or the direct current to direct current converter fluctuate according to the predetermined voltage waveform, it is possible to make the voltage fluctuation width of the second battery greater than voltage fluctuation with operation of the electric load. Then, since it is possible to calculate the internal resistance of the second battery using the voltage value and the current value detected in a state where the voltage fluctuation width of the second battery is made greater, it is possible to improve calculation accuracy compared to a case of calculating internal resistance using voltage fluctuation with operation of the electric load. That is, it is possible to realize high accuracy in calculation of internal resistance.

According to the above-described aspect, in the electric power supply system for a vehicle in which the first battery and the second battery are connected in parallel, it is possible to calculate the internal resistance of the second battery with high reproducibility and high accuracy.

In the above-described aspect, the electronic control unit may be configured to: determine whether or not the electric power supply system is in a situation capable of making the voltage of the alternator or the direct current to direct current converter fluctuate according to the predetermined voltage waveform; and make the voltage of the alternator or the direct current to direct current converter fluctuate according to the predetermined voltage waveform when the electronic control unit determines that the electric power supply system is in a situation capable of making the voltage of the alternator or the direct current to direct current converter fluctuate according to the predetermined voltage waveform.

In the above-described aspect, the predetermined voltage waveform may be generated based on an upper limit voltage value for preventing the first battery from being overcharged and a lower limit voltage value for suppressing a decrease in charging rate of the first battery.

In the above-described aspect, the predetermined voltage waveform may change from the upper limit voltage value to the lower limit voltage value.

In the above-described aspect, the electronic control unit may be configured to: make the voltage of the alternator or the direct current to direct current converter repeatedly fluctuate in the same form as the predetermined voltage waveform, and calculate the internal resistance of the second battery each time the electronic control unit makes the voltage of the alternator or the direct current to direct current converter repeatedly fluctuate in the same form as the predetermined voltage waveform.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described referring to the accompanying drawings. In the specification and the drawings, components having the substantially same functional configurations are represented by the same reference numerals, and overlapping description will not be repeated.

Figure 1:
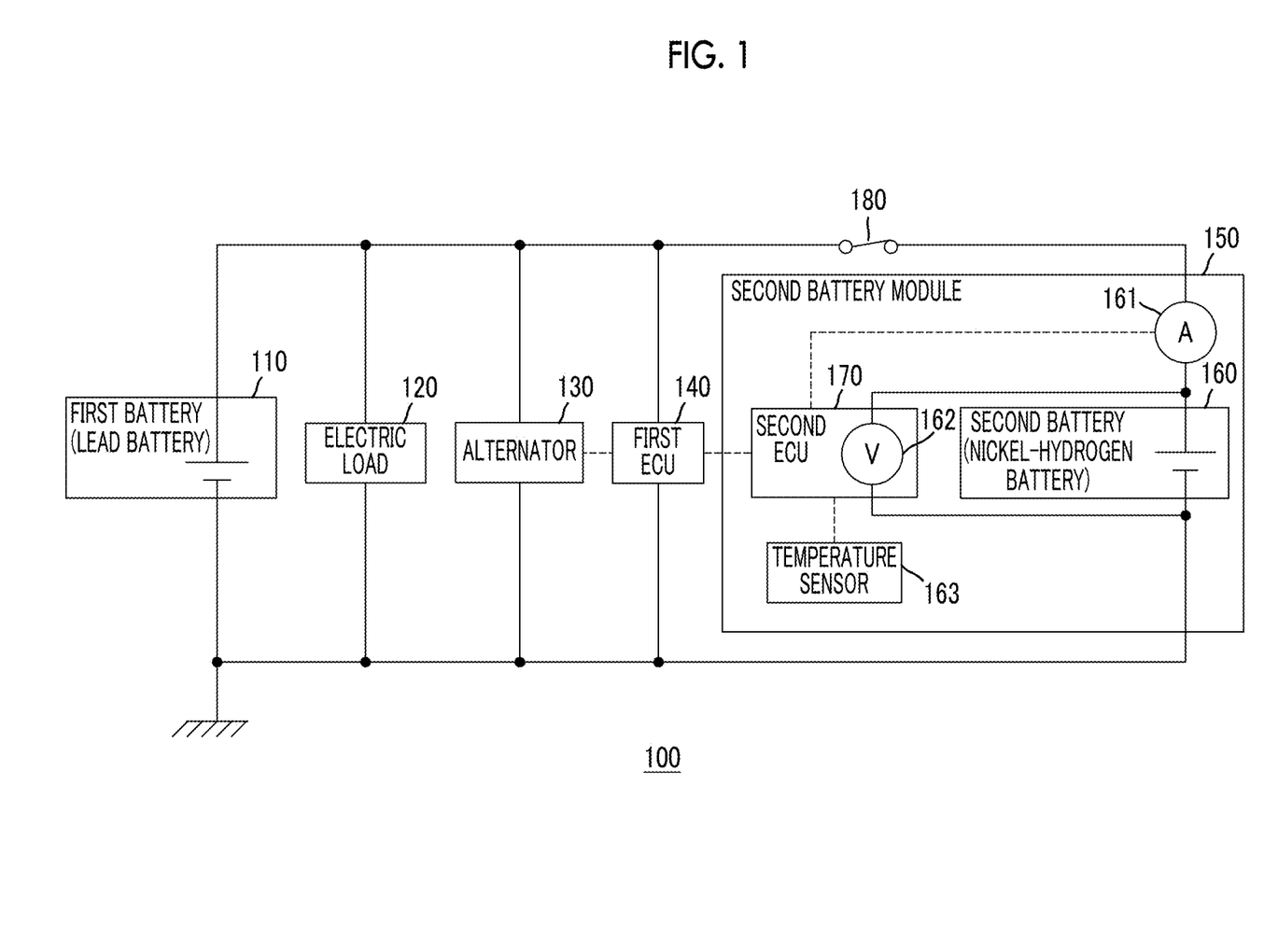
FIG. 1 is a diagram showing a configuration example of an electric power supply system for a vehicle.

First, the configuration of an electric power supply system for a vehicle of this embodiment will be described. FIG. 1 is a diagram showing a configuration example of the electric power supply system for a vehicle. An electric power supply system 100 for a vehicle shown in FIG. 1 is an electric power supply system for a vehicle which supplies electric power to electric loads mounted in a vehicle, and is an electric power supply system which is applied to, for example, a non-hybrid vehicle.

As shown in FIG. 1, the electric power supply system 100 for a vehicle has a first battery 110, an electric load 120, an alternator 130, a first ECU 140, a second battery module 150, and a relay 180.

In FIG. 1, for simplification of description, only equipment related to calculation of internal resistance of the second battery module 150 is shown, and other kinds of equipment are not shown.

For example, examples of a target to which electric power is supplied in the electric power supply system 100 for a vehicle include, in addition to the electric load 120, an engine starter, a shift-by-wire, an electric parking brake, and the like. However, these devices are not related to calculation of internal resistance of a second battery 160, and thus, are not shown in the electric power supply system 100 for a vehicle of FIG. 1.

When calculating the internal resistance of the second battery 160, it is premised that the relay 180 is in an ON state. For this reason, in the electric power supply system 100 for a vehicle of FIG. 1, the relay 180 is shown as being in the ON state. In this embodiment, it is assumed that the first ECU 140 or a second ECU 170 performs control of the ON/OFF state of the relay 180.

Hereinafter, equipment (equipment related to calculation of the internal resistance of the second battery 160) shown in FIG. 1 will be described in order. The first battery 110 is a DC power supply which outputs a voltage of about DC 12 [V], and is a chargeable/dischargeable secondary battery. The first battery 110 is charged with electric power generated by the alternator 130, and supplies charged electric power to the electric load 120 at the time of operation of the electric load 120. The first battery 110 has capacity (for example, 50 [Ah] to 80 [Ah]) determined in advance, and is realized by, for example, a lead battery.

The electric load 120 is equipment which is operated based on the supply of electric power from the first battery 110 or the like. Examples of the electric load 120 include a headlamp, an air conditioner, an audio, meter electric components, a wiper, and the like.

The alternator 130 is a power generator which generates electric power with rotation of an engine (not shown).

Electric power generated by the alternator 130 is supplied to the first battery 110 connected in parallel with the alternator 130. With this, the first battery 110 is charged. Furthermore, electric power generated by the alternator 130 is supplied to the second battery 160 connected in parallel with the alternator 130. With this, the second battery 160 is charged. In addition, electric power generated by the alternator 130 is supplied to the electric load 120 at the time of operation of the electric load 120.

The first ECU 140 is an electronic control unit (ECU) which controls a generated voltage of the alternator 130. The first ECU 140 performs control such that the generated voltage is suppressed in a case where there is a request to suppress power generation of the alternator 130 from an engine ECU (not shown), for example, in a state where a rotation speed of the engine is unstable. Furthermore, for example, in a case where it is determined that the state of charge (SOC; the ratio of charge capacity to a residual amount of charge or the charging rate) of the first battery 110 decreases, the first ECU 140 control the generated voltage such that the SOC of the first battery 110 increases.

In addition, in a case where a voltage fluctuation request from the second ECU 170 of the second battery 160 is received, the first ECU 140 controls the generated voltage of the alternator 130 such that the generated voltage of the alternator 130 fluctuates according to a predetermined voltage waveform.

A state where the first ECU 140 controls the generated voltage of the alternator 130 in response to the request from the engine ECU or according to the SOC of the first battery 110, or the like is referred to as a "normal control state". Furthermore, a state where the first ECU 140 controls the generated voltage of the alternator 130 in response to the voltage fluctuation request from the second ECU 170 is referred to as an "internal resistance calculation state".

The second battery module 150 has a second battery 160, a current sensor 161 which detects a current value of the second battery 160, and a voltage sensor 162 which detects a voltage value of the second battery 160. Furthermore, the second battery module 150 has a temperature sensor 163 which detects a temperature value of the second battery 160, and the second ECU 170. It is assumed that the voltage sensor 162 is provided in the second ECU 170.

The second battery 160 is a DC power supply which outputs a voltage of DC 12 [V] which is nearly the same as or a voltage slightly higher than an output voltage of the first battery 110, and is a chargeable/dischargeable secondary battery.

In a case where the relay 180 is brought in the ON state when calculating the internal resistance, the second battery 160 is charged by increasing the generated voltage of the alternator 130 or is discharged by decreasing the generated voltage of the alternator 130.

The second battery 160 is connected in parallel with the first battery 110 when the relay 180 is brought into the ON state in a case where a high load is applied to the first battery 110 with operation of the electric load 120, or the like, and backs up the first battery 110. In this embodiment, backing up the first battery 110 means supplying electric power to the electric load 120 instead of the first battery 110 or along with the first battery 110.

The second battery 160 has capacity determined in advance (for example, 6 [Ah] to 10 [Ah] lower than the capacity of the first battery 110), and is realized by, for example, a nickel-hydrogen battery.

The second ECU 170 acquires the current value detected by the current sensor 161, the voltage value detected by the voltage sensor 162, and the temperature value detected by the temperature sensor 163. Furthermore, the second ECU 170 calculates the internal resistance of the second battery 160 based on the acquired current value and voltage value. In addition, the second ECU 170 estimates a deterioration degree of the second battery 160 using the calculated internal resistance and the acquired temperature value and determines the lifetime of the second battery 160.

The second ECU 170 transmits the voltage fluctuation request to the first ECU 140 in calculating the internal resistance of the second battery 160. The second ECU 170 acquires the current value, the voltage value, and the temperature value after transmitting the voltage fluctuation request to the first ECU 140, and performs calculation of the internal resistance of the second battery 160, estimation of the deterioration degree, and determination of the lifetime.

Figure 2:
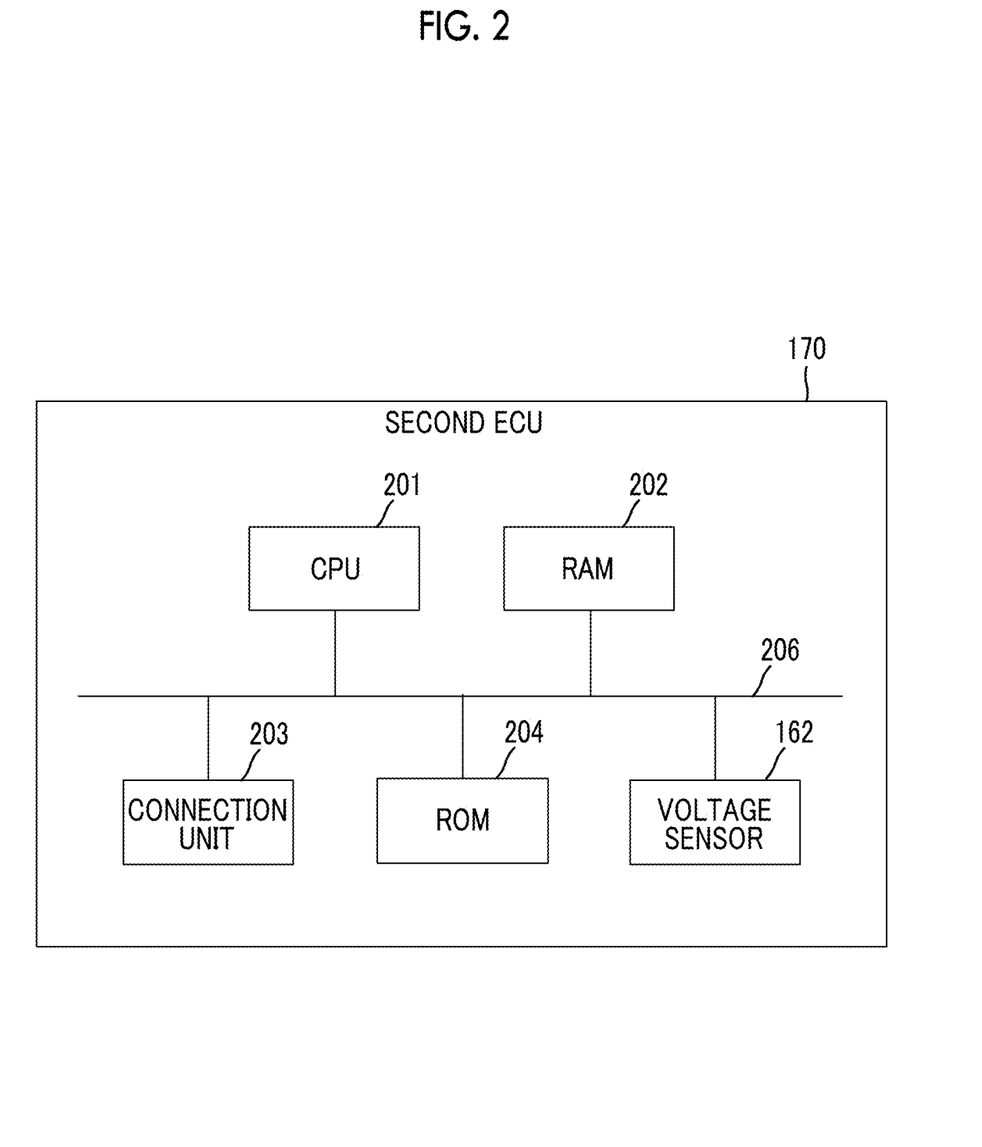
FIG. 2 is a diagram showing an example of the hardware configurations of a first ECU and a second ECU.

Next, the hardware configurations of the first ECU 140 and the second ECU 170 will be described. Since the hardware configuration of the first ECU 140 is substantially the same as the hardware configuration of the second ECU 170, here, the hardware configuration of the second ECU 170 will be described.

FIG. 2 is a diagram showing an example of the hardware configuration of the second ECU 170. As shown in FIG. 2, the second ECU 170 has a central processing unit (CPU) 201 and a random access memory (RAM) 202. Furthermore, the second ECU 170 has a connection unit 203, a read only memory (ROM) 204, and the voltage sensor 162. In this embodiment, the ROM 204 stores a deterioration determination processing program, and the second ECU 170 functions as a deterioration determination processing unit by the CPU 201 executing the deterioration determination processing program with the RAM 202 as a work area.

Specifically, the CPU 201 executes the deterioration determination processing program, whereby the second ECU 170 transmits the voltage fluctuation request to the first ECU 140 through the connection unit 203. Furthermore, the CPU 201 executes the deterioration determination processing program, whereby the second ECU 170 acquires the current value and the temperature value through the connection unit 203 and records the current value and the temperature value in the RAM 202 along with the voltage value acquired from the voltage sensor 162. In addition, the CPU 201 executes the deterioration determination processing program, whereby the second ECU 170 reads the contents recorded in the RAM 202 and calculates the internal resistance of the second battery 160 to estimate the deterioration degree and to determine the lifetime.

Figure 3:
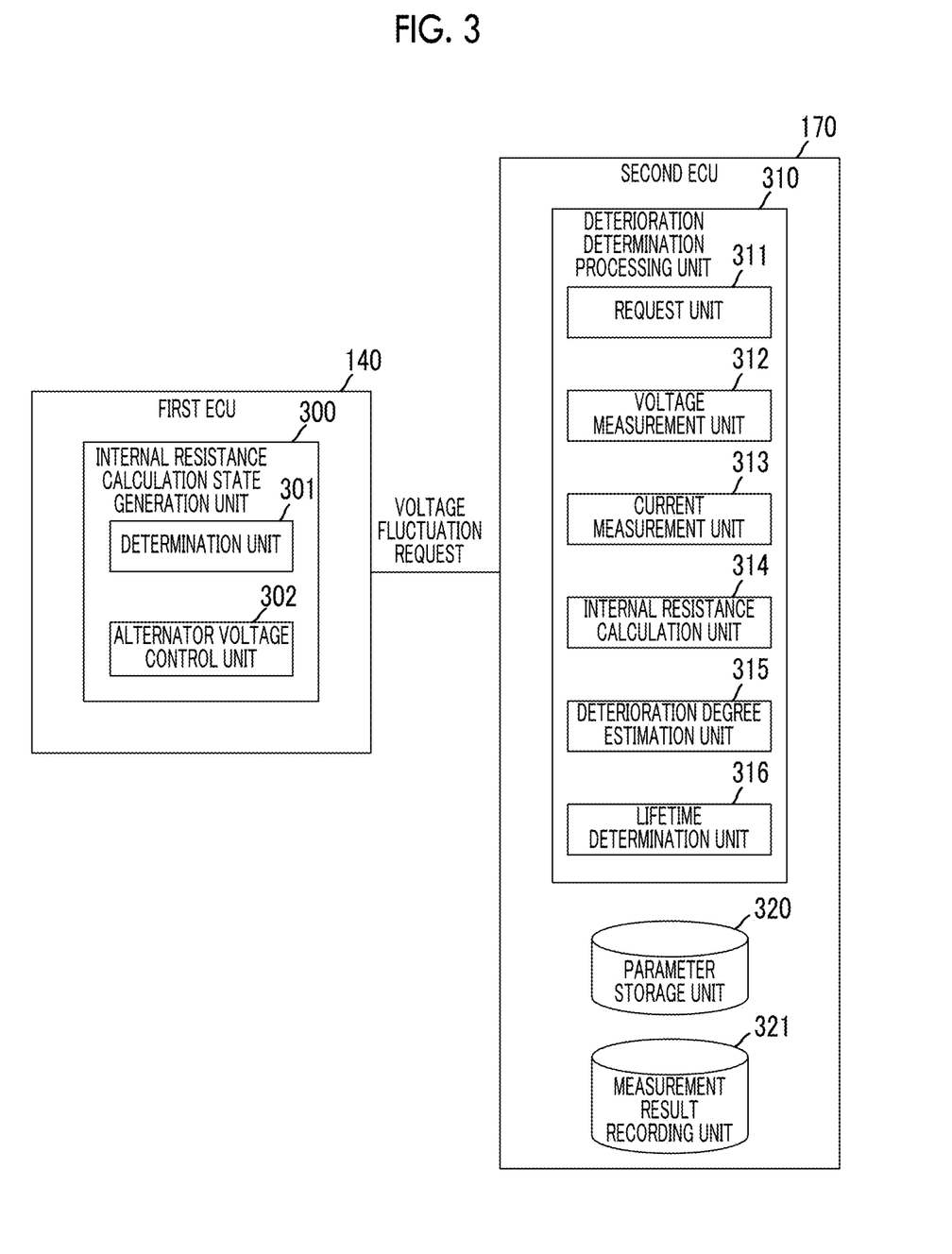
FIG. 3 is a diagram showing an example of the functional configuration of the first ECU and the second ECU.

Next, the functional configuration of the first ECU 140 and the functional configuration of the second ECU 170 will be described. FIG. 3 is a diagram showing an example of the functional configurations of the first ECU and the second ECU.

As shown in FIG. 3, the first ECU 140 has an internal resistance calculation state generation unit 300, and the internal resistance calculation state generation unit 300 has a determination unit 301 and an alternator voltage control unit 302.

The determination unit 301 receives the voltage fluctuation request transmitted from the second ECU 170. If the voltage fluctuation request is received, the determination unit 301 determines whether or not the current situation of the electric power supply system 100 for a vehicle is a situation capable of calculating the internal resistance (whether or not the electric power supply system 100 for a vehicle is in a situation in which the generated voltage of the alternator 130 may be made fluctuate according to the predetermined voltage waveform).

For example, in a case where there is a request to suppress the generated voltage of the alternator 130 from the engine ECU (not shown), the determination unit 301 determines that the current situation of the electric power supply system 100 for a vehicle is a situation incapable of calculating the internal resistance. This is because, in a situation in which the rotation speed of the engine is unstable, if the generated voltage of the alternator 130 is made fluctuate, an engine stall occurs or knocking occurs, the request from the engine ECU is given priority.

In a case where it is determined that the SOC of the first battery 110 decreases, the determination unit 301 also determines that the current situation of the electric power supply system 100 for a vehicle is a situation incapable of calculating the internal resistance. This is because control of the generated voltage of the alternator 130 such that the SOC of the first battery 110 increases is given priority.

In a case where it is determined that the current situation of the electric power supply system 100 for a vehicle is a situation incapable of calculating the internal resistance, the first ECU 140 is maintained in the normal control state. In this case, the generated voltage of the alternator 130 is controlled based on another request given priority. In a case where it is determined that the current situation of the electric power supply system 100 for a vehicle is a situation capable of calculating the internal resistance, the first ECU 140 transitions to the internal resistance calculation state. In this case, the generated voltage of the alternator 130 is controlled based on the voltage fluctuation request.

The voltage fluctuation request transmitted from the second ECU 170 includes an upper limit voltage value, a lower limit voltage value, and a voltage fluctuation rate value for making the generated voltage of the alternator 130 fluctuate according to the predetermined voltage waveform.

If the voltage fluctuation request is received from the determination unit 301, the alternator voltage control unit 302 extracts the upper limit voltage value, the lower limit voltage value, and the voltage fluctuation rate value included in the voltage fluctuation request. The alternator voltage control unit 302 generates a voltage waveform used when making the generated voltage of the alternator 130 fluctuate based on the respective extracted values.

The alternator voltage control unit 302 controls the generated voltage of the alternator 130 such that the generated voltage of the alternator 130 fluctuates according to the generated voltage waveform.

The second ECU 170 has a deterioration determination processing unit 310. The deterioration determination processing unit 310 has a request unit 311, a voltage measurement unit 312, a current measurement unit 313, an internal resistance calculation unit 314, a deterioration degree estimation unit 315, and a lifetime determination unit 316.

The request unit 311 transmits the voltage fluctuation request to the first ECU 140. For example, the request unit 311 transmits the voltage fluctuation request in a case where a predetermined time (for example, 140 [Sec]) elapses after the engine of the vehicle is ON. Alternatively, the request unit 311 transmits the voltage fluctuation request in a case where traveling of the vehicle is continued for a predetermined time (for example, 4 [h]). Alternatively, the request unit 311 transmits the voltage fluctuation request in a case where a given period (for example, 1 [week]) elapses from transmission of a previous voltage fluctuation request.

The request unit 311 refers to a parameter storage unit 320 in transmitting the voltage fluctuation request, and reads the upper limit voltage value, the lower limit voltage value, and the voltage fluctuation rate value used when the alternator voltage control unit 302 generates the voltage waveform. The request unit 311 generates the voltage fluctuation request including the read upper limit voltage value, lower limit voltage value, and voltage fluctuation rate value and transmits the voltage fluctuation request to the first ECU 140. The parameter storage unit 320 is a storage area formed in the ROM 204.

Figure 4:
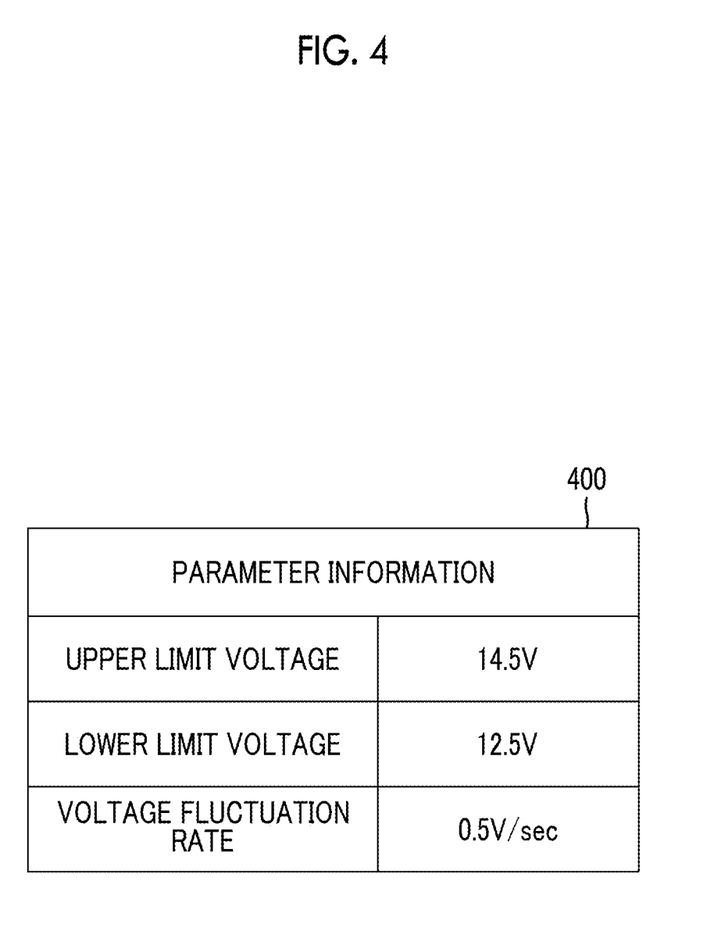
FIG. 4 is a diagram showing an example of parameter information.

FIG. 4 is a diagram showing an example of parameter information stored in the parameter storage unit. As shown in FIG. 4, parameter information 400 stored in the parameter storage unit 320 includes, as items of information, "upper limit voltage", "lower limit voltage", and "voltage fluctuation rate".

The item "upper limit voltage" defines an upper limit value for preventing the first battery 110 from being overcharged in the internal resistance calculation state in making the generated voltage of the alternator 130 fluctuate in order to calculate the internal resistance. The example of FIG. 4 shows that "14.5 [V]" is defined as the upper limit voltage value.

The item "lower limit voltage" defines a lower limit value for suppressing a significant decrease in the SOC of the first battery 110 in the internal resistance calculation state when making the generated voltage of the alternator 130 fluctuate in order to calculate the internal resistance. The example of FIG. 4 shows that the "12.5 [V]" is defined as the lower limit voltage value.

The term "voltage fluctuation rate" defines an upper limit value of a fluctuation rate for preventing an influence on the operation of the electric load 120 in the internal resistance calculation state when making the generated voltage of the alternator 130 fluctuate in order to calculate the internal resistance. The example of FIG. 4 shows that, if the fluctuation rate of the generated voltage of the alternator 130 is equal to or lower than "0.5 [V/Sec]", there is no influence on the operation of the electric load 120. As the influence on the operation of the electric load 120, for example, a case where a headlamp which is an example of the electric load 120 blinks, or the like is exemplified.

In this way, the upper limit voltage value, the lower limit voltage value, and the voltage fluctuation rate value used in generating the voltage waveform are defined such that there is no influence on the first battery 110 and the electric load 120 even if the generated voltage of the alternator 130 is made fluctuate.

Returning to the description of FIG. 3, in a case where the voltage fluctuation request is transmitted from the request unit 311, the voltage measurement unit 312 acquires the voltage value output from the voltage sensor 162 and records the voltage value in a measurement result recording unit 321. The measurement result recording unit 321 is an area which is temporarily formed in the RAM 202.

In a case where the voltage fluctuation request is transmitted from the request unit 311, the current measurement unit 313 acquires the current value output from the current sensor 161 and records the current value in the measurement result recording unit 321.

The internal resistance calculation unit 314 reads the voltage value and the current value recorded in the measurement result recording unit 321 and calculates the value of internal resistance (internal resistance value) of the second battery 160. The internal resistance calculation unit 314 gives notification of the calculated internal resistance value to the deterioration degree estimation unit 315. When the internal resistance value is calculated, the internal resistance calculation unit 314 acquires the temperature value output from the temperature sensor 163 and records the temperature value in the measurement result recording unit 321.

If the internal resistance value is received from the internal resistance calculation unit 314, the deterioration degree estimation unit 315 reads the temperature value recorded in the measurement result recording unit 321 and estimates the deterioration degree of the second battery 160 from the received internal resistance value based on the read temperature value. The deterioration degree estimation unit 315 gives notification of the estimated deterioration degree to the lifetime determination unit 316.

The reason that the temperature value is read when estimating the deterioration degree is because the internal resistance of the second battery 160 depends on the temperature, the higher the temperature, the smaller the internal resistance, and the lower the temperature, the larger the internal resistance. Accordingly, the deterioration degree estimation unit 315 estimates the deterioration degree of the second battery 160 by correcting the amount of an increase of the internal resistance value received from the internal resistance calculation unit 314 due to a low temperature of the second battery 160.

The lifetime determination unit 316 determines whether or not the deterioration degree received from the deterioration degree estimation unit 315 is equal to or greater than a predetermined threshold. In a case where it is determined that the deterioration degree is equal to or greater than the predetermined threshold, the lifetime determination unit 316 determines the second battery 160 is at the end of the lifetime and outputs an alarm to the user.

Figure 5A:
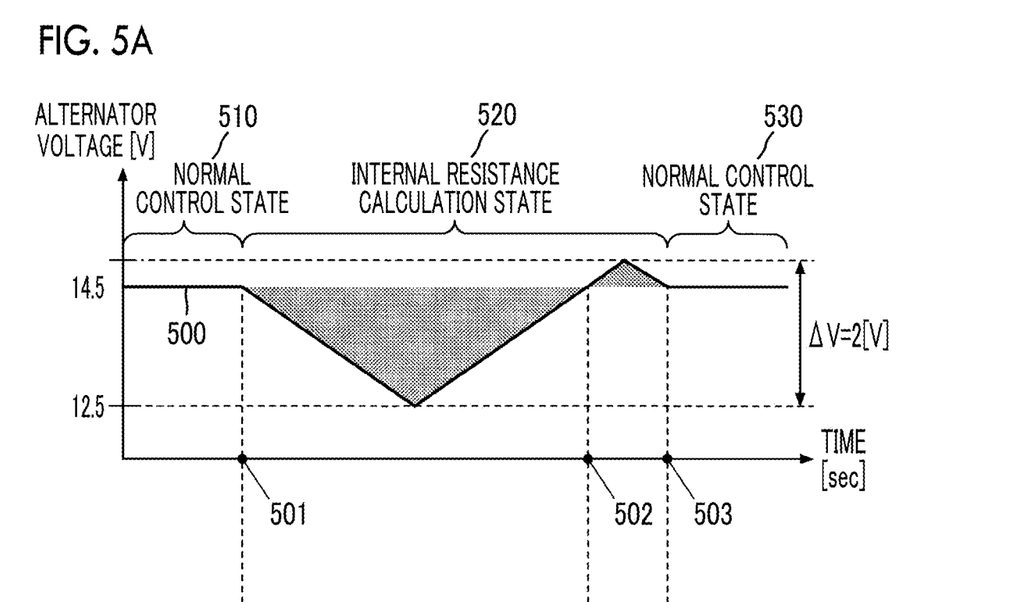
FIG. 5A is a diagram illustrating a voltage waveform of an alternator and a current waveform of a second battery.
Figure 5B:
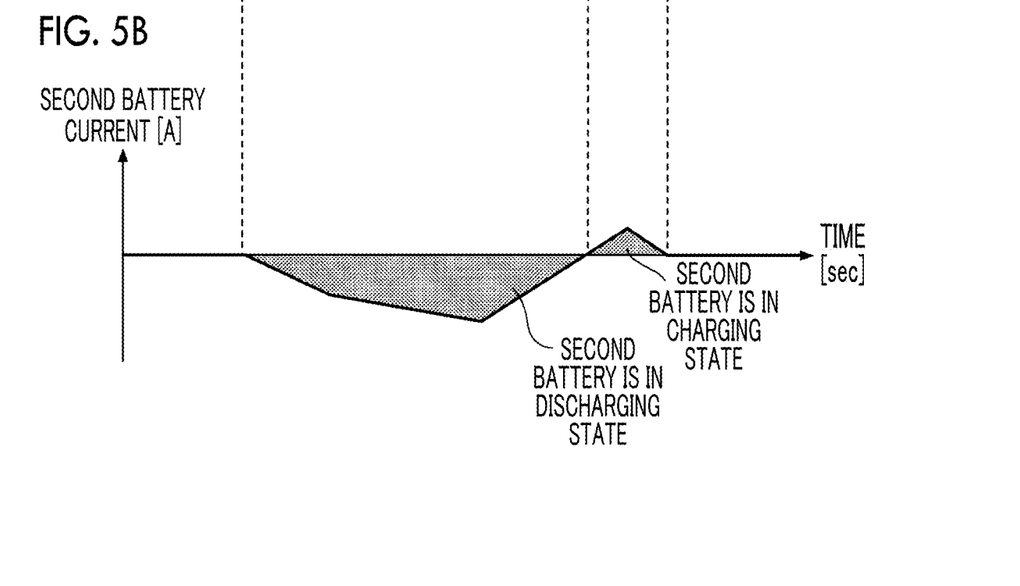
FIG. 5B is a diagram illustrating the voltage waveform of the alternator and the current waveform of the second battery.

Next, the voltage waveform in a case where the alternator voltage control unit 302 makes the generated voltage of the alternator 130 fluctuate and the current waveform of the second battery 160 which is acquired by the current measurement unit 313 in the internal resistance calculation state will be described. FIGS. 5A and 5B are diagrams illustrating the voltage waveform of the alternator and the current waveform of the second battery.

In FIG. 5A, the horizontal axis represents time, and the vertical axis represents a voltage value in a case where the alternator voltage control unit 302 makes the generated voltage of the alternator 130 fluctuate. In FIG. 5B, the horizontal axis represents time, and the vertical axis represents a current value of the second battery 160.

As shown in FIG. 5A, it is assumed that a voltage value 500 in a case where the alternator voltage control unit 302 makes the generated voltage of the alternator 130 fluctuate is about 14.2 [V] in a normal control state 510. In this state, as shown in FIG. 5B, it is assumed that the second battery 160 perform neither charging nor discharging.

At timing 501, if the request unit 311 transmits the voltage fluctuation request, the alternator voltage control unit 302 transitions to an internal resistance calculation state 520 and makes the generated voltage of the alternator 130 fluctuate. It is assumed that the relay 180 is in the ON state in making the generated voltage of the alternator 130 fluctuate.

The example of FIG. 5A shows that the alternator voltage control unit 302 makes the generated voltage of the alternator 130 fluctuate from the voltage value (14.2 [V]) at the timing 501 toward the lower limit voltage value (12.5 [V]) at the voltage fluctuation rate (−0.5 [V/Sec]).

The example of the FIG. 5A shows that, if the lower limit voltage value (12.5 [V]) is reached, the alternator voltage control unit 302 makes the generated voltage of the alternator 130 fluctuate toward the upper limit voltage value (14.5 [V]) at the voltage fluctuation rate (0.5 [V/Sec]).

After the fluctuation of the generated voltage starts at the timing 501, at timing 502, in a period during which the generated voltage of the alternator 130 returns to the generated voltage at the time of the start of the voltage fluctuation (timing 501), as shown in FIG. 5B, the second battery 160 is brought into a discharging state. In this period, since the generated voltage of the alternator 130 does not fall below the lower limit voltage value, the SOC of the first battery 110 does not significantly decrease with fluctuation of the generated voltage of the alternator 130. In this period, since the generated voltage of the alternator 130 fluctuates at the voltage fluctuation rate value, fluctuation of the generated voltage of the alternator 130 has no influence on the operation of the electric load 120.

As shown in FIG. 5B, the reason that the current value of the second battery 160 in the discharging state does not have a constant gradient is because that there is an influence of the first battery 110. Specifically, this is because, in a process of making the generated voltage of the alternator 130 fluctuate toward the lower limit voltage value, the first battery 110 itself is somewhat discharged. In a case where the first battery 110 is a new article or the SOC of the first battery 110 is sufficient, such a phenomenon is likely to occur.

The example of FIG. 5A shows that the generated voltage of the alternator 130 exceeds the generated voltage at the time of the start of the voltage fluctuation (timing 501) at the timing 502. The example of FIG. 5A shows that, after the generated voltage of the alternator 130 reaches the upper limit voltage value (14.5 [V]), the alternator voltage control unit 302 makes the generated voltage of the alternator 130 fluctuate at the voltage fluctuation rate value (−0.5 [V/Sec]). The example of FIG. 5A shows that the generated voltage of the alternator 130 reaches the generated voltage at the time of the start of the voltage fluctuation (timing 501) at timing 503.

In a period during which the generated voltage reaches the generated voltage at the time of the start of the voltage fluctuation at the timing 503 after exceeding the generated voltage at the time of the start of the voltage fluctuation the timing 502, as shown in FIG. 5B, the second battery 160 is brought into a charging state. In this period, since the generated voltage of the alternator 130 does not exceed the upper limit voltage value, the first battery 110 is not overcharged with fluctuation of the generated voltage of the alternator 130. In this period, since the generated voltage of the alternator 130 fluctuates at the voltage fluctuation rate value, fluctuation of the generated voltage of the alternator 130 has no influence on the operation of the electric load 120.

At the timing 503, if the generated voltage reaches the generated voltage at the time of the start of the voltage fluctuation (timing 501), the first ECU 140 transitions from the internal resistance calculation state 520 to a normal control state 530.

In this way, the alternator voltage control unit 302 makes the generated voltage of the alternator 130 fluctuate between the lower limit voltage value and the upper limit voltage value in the internal resistance calculation state 520. In the example of FIG. 5A, the voltage fluctuation width (ΔV) at this time is 2 [V], and is a voltage fluctuation width sufficient for calculating the internal resistance of the second battery 160 with satisfactory accuracy. Accordingly, by means of the voltage value and the current value acquired in the internal resistance calculation state 520, according to this embodiment, it is possible to realize high accuracy in the calculation of the internal resistance.

In the alternator voltage control unit 302, the same values are used every time as the lower limit voltage value, the upper limit voltage value, and the voltage fluctuation rate value when making the generated voltage of the alternator 130 fluctuate in the internal resistance calculation state 520 (that is, the voltage waveform is made uniform). Accordingly, if the internal resistance of the second battery 160 is identical, the current waveform of the second battery 160 becomes identical every time. That is, according to this embodiment, it is possible to realize high reproducibility in the calculation of the internal resistance.

Next, measurement result information which is recorded in the measurement result recording unit 321 of the second ECU 170 will be described. Furthermore, a calculation method which calculates the internal resistance of the second battery based on the measurement result information will be described.

Figure 6A:
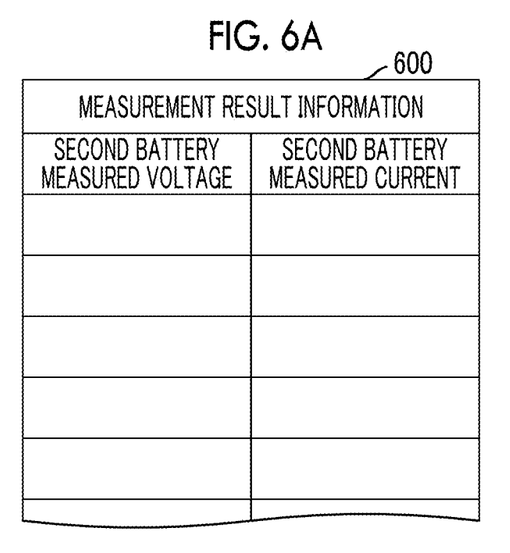
FIG. 6A is a diagram showing an example of measurement result information and a method of calculating the internal resistance of the second battery.
Figure 6B:
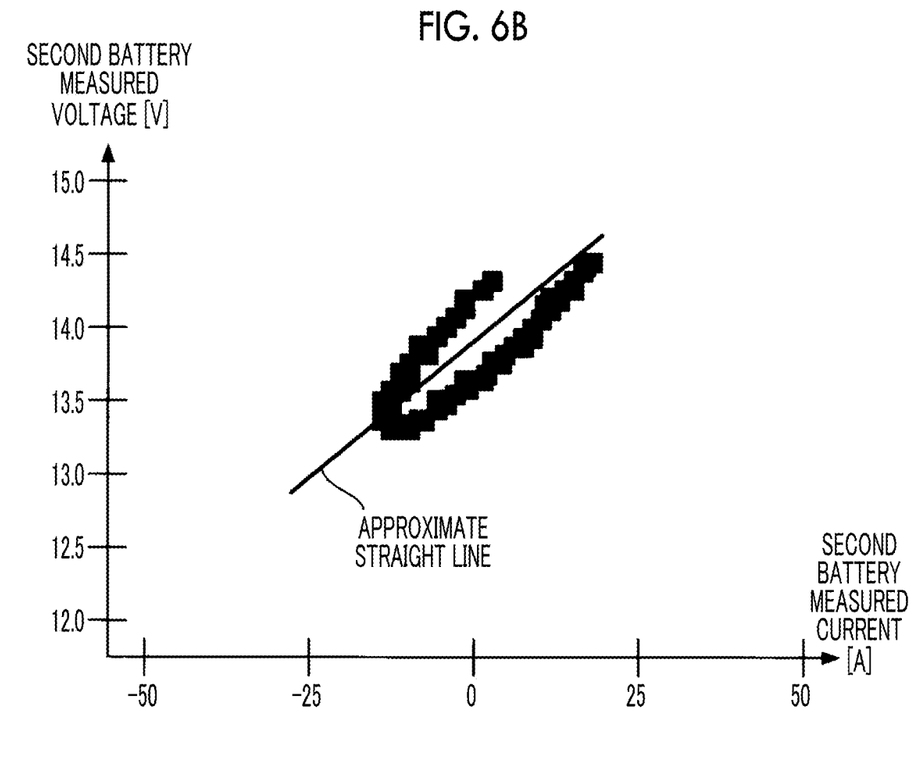
FIG. 6B is a diagram showing an example of the measurement result information and a method of calculating the internal resistance of the second battery.

FIGS. 6A and 6B are diagrams illustrating an example of the measurement result information and a method of calculating the internal resistance of the second battery. As shown in FIG. 6A, measurement result information 600 includes, as items of information, "second battery measured voltage" and "second battery measured current".

In the item "second battery measured voltage", a voltage value acquired by the voltage measurement unit 312 in the internal resistance calculation state 520 is recorded. The voltage value acquired by the voltage measurement unit 312 is equal to, for example, the potential difference between a positive electrode terminal and a negative electrode terminal of the second battery 160.

In the item "second battery measured current", a current value acquired by the current measurement unit 313 in the internal resistance calculation state 520 is recorded.

FIG. 6B is a graph in which a voltage value recorded in the item "second battery measured voltage" and a current value recorded in the item "second battery measured current" of the measurement result information 600 are plotted. In FIG. 6B, the horizontal axis represents a current value, and the vertical axis represents a voltage value.

The internal resistance calculation unit 314 calculates an approximate straight line (see the following expression) based on each plot and calculates a gradient (internal resistance value) of the calculated approximate straight line.

$$(\text{voltage value}) = (\text{gradient}) \times (\text{current value}) + (\text{intercept})$$

As will be apparent from FIG. 6B, the intercept of the approximate straight line does not become zero. For this reason, it can be said that, in order to calculate the internal resistance value, at least two plots are required.

As will be apparent from FIG. 6B, if the voltage fluctuation width is small, a plotting result has a shape close to a circle, and an error when calculating the gradient becomes large. If the voltage fluctuation width is large, the plotting result has a shape close to a straight line, and an error when calculating the gradient becomes small. That is, it can be said that the range (voltage fluctuation width) between the lower limit voltage value and the upper limit voltage value is made large, whereby it is possible to calculate the internal resistance of the second battery 160 with high accuracy.

As shown in FIG. 6B, the plotting results are different between when the generated voltage of the alternator 130 is increasing and when the generated voltage of the alternator 130 is decreasing are not the same (include a hysteresis) due to the characteristics of the second battery 160.

Taking such characteristics into consideration, in the internal resistance calculation unit 314, for example, only the plotting result when increasing the generated voltage of the alternator 130 may be used in the calculation of the gradient. Alternatively, only the plotting result when decreasing the generated voltage of the alternator 130 may be used. Alternatively, as shown in FIG. 6B, both plotting results may be used.

Figure 7:
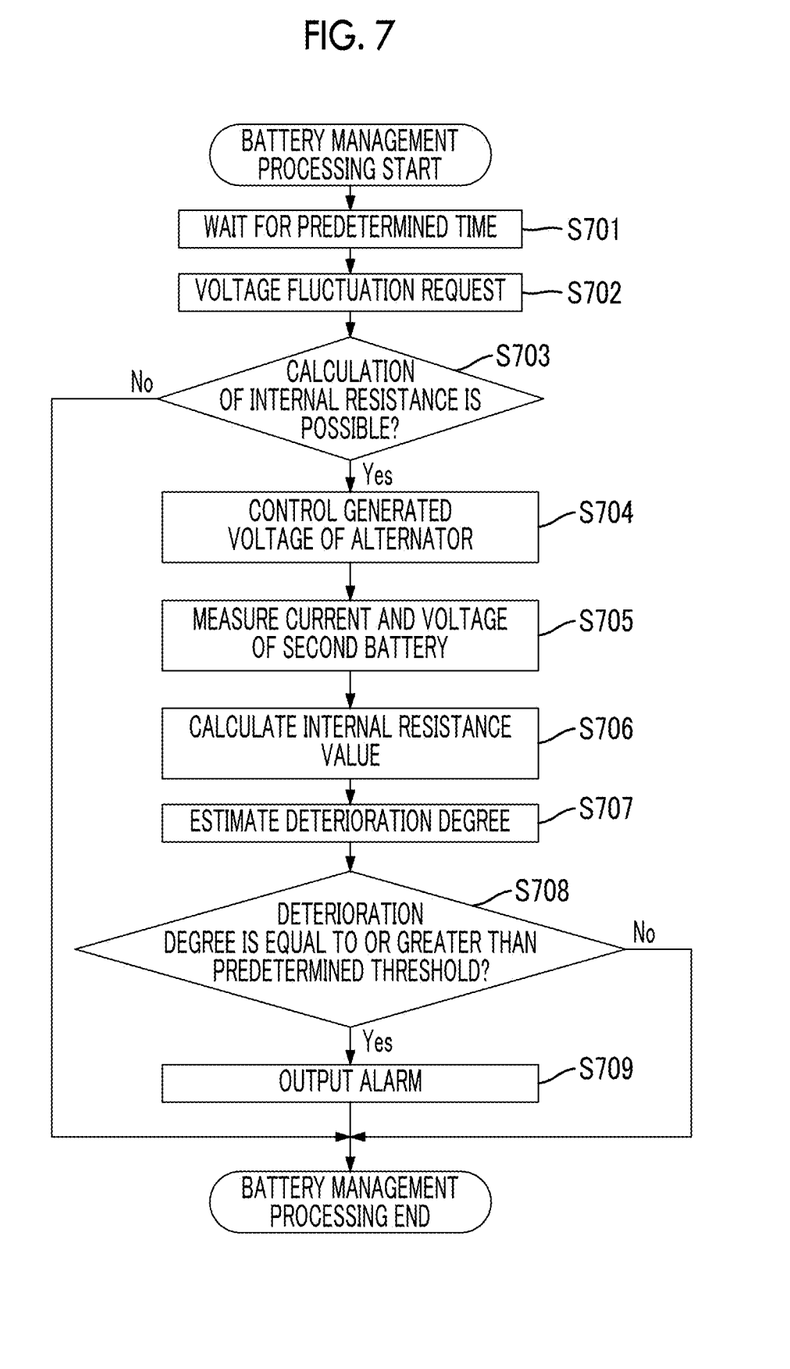
FIG. 7 is a flowchart showing the flow of battery management processing in the electric power supply system for a vehicle.

Next, the flow of battery management processing in the electric power supply system 100 for a vehicle will be described. FIG. 7 is a flowchart showing the flow of the battery management processing in the electric power supply system for a vehicle. The flowchart shown in FIG. 7 is executed, for example, if the engine of the vehicle is in the ON state.

In Step S701, the request unit 311 waits for a predetermined time (for example, 140 [Sec]) until the rotation speed of the engine is stabilized.

In Step S702, the request unit 311 refers to the parameter storage unit 320, reads the upper limit voltage value, the lower limit voltage value, and the voltage fluctuation rate value, and generates the voltage fluctuation request including the respective values. The request unit 311 transmits the voltage fluctuation request to the first ECU 140.

In Step S703, if the voltage fluctuation request is received, the determination unit 301 determines whether or not the current situation of the electric power supply system 100 for a vehicle is a situation capable of calculating the internal resistance.

In Step S703, in a case where it is determined that the current situation of the electric power supply system 100 for a vehicle is a situation incapable of calculating the internal resistance, the battery management processing ends. With this, in a case where there is another request given priority, it is possible to control the generated voltage of the alternator 130 based on another request given priority. In Step S703, in a case where it is determined that the current situation of the electric power supply system 100 for a vehicle is a situation capable of calculating the internal resistance, the process progresses to Step S704.

In Step S704, the determination unit 301 gives notification of the voltage fluctuation request to the alternator voltage control unit 302. Upon receiving the voltage fluctuation request, the alternator voltage control unit 302 generates the voltage waveform when making the generated voltage of the alternator 130 fluctuate based on the upper limit voltage value, the lower limit voltage value, and the voltage fluctuation rate value included in the voltage fluctuation request. The alternator voltage control unit 302 controls the generated voltage of the alternator 130 such that the generated voltage of the alternator 130 fluctuates according to the generated voltage waveform.

In Step S705, the voltage measurement unit 312 acquires the voltage value detected by the voltage sensor 162 and records the voltage value in the measurement result recording unit 321. The current measurement unit 313 acquires the current value detected by the current sensor 161 and records the current value in the measurement result information 600 of the measurement result recording unit 321.

In Step S706, the internal resistance calculation unit 314 calculates the internal resistance value using the measurement result information 600 recorded in the measurement result recording unit 321. The internal resistance calculation unit 314 acquires the temperature value detected by the temperature sensor 163 and records the temperature value in the measurement result recording unit 321.

In Step S707, if the internal resistance value calculated in Step S706 is received, the deterioration degree estimation unit 315 reads the temperature value recorded in the measurement result recording unit 321 and estimates the deterioration degree of the second battery 160 from the received internal resistance value based on the read temperature value. The deterioration degree estimation unit 315 gives notification of the estimated deterioration degree to the lifetime determination unit 316.

In Step S708, the lifetime determination unit 316 determines whether or not the deterioration degree notified from the deterioration degree estimation unit 315 is equal to or greater than the predetermined threshold. In Step S708, in a case where it is determined that deterioration degree is equal to or greater than the predetermined threshold, the lifetime determination unit 316 determines that the second battery 160 is at the end of the lifetime and outputs an alarm to the user, and the battery management processing ends. In a case where it is determined that the deterioration degree is less than the predetermined threshold, the battery management processing ends without outputting an alarm to the user.

As will be apparent from the above description, in the electric power supply system for a vehicle of this embodiment, the generated voltage of the alternator is made fluctuate based on the predetermined voltage waveform, and in the interim, voltage fluctuation and current fluctuation (voltage value and current value) of the second battery connected to the alternator are detected. Then, the internal resistance of the second battery is calculated using the detected voltage value and current value. With this, it is possible to calculate the internal resistance of the second battery with high reproducibility and high accuracy compared to a case of using voltage fluctuation and current fluctuation of the second battery at the time of electric load operation.

In the electric power supply system for a vehicle of this embodiment, the voltage fluctuation rate value is defined such that there is no influence on the operation of the electric load in making the generated voltage of the alternator fluctuate based on the predetermined voltage waveform. With this, it is possible to prevent a situation in which fluctuation of the generated voltage of the alternator has an influence on the operation of the electric load.

In the electric power supply system for a vehicle of this embodiment, the upper limit voltage value is defined such that overcharging of the first battery is prevented in making the generated voltage of the alternator fluctuate based on the predetermined voltage waveform. With this, it is possible to prevent a situation in which the first battery is overcharged with fluctuation of the generated voltage of the alternator.

In the electric power supply system for a vehicle of this embodiment, the lower limit voltage value is defined such that a significant decrease in the SOC of the first battery is prevented in making the generated voltage of the alternator fluctuate based on the predetermined voltage waveform. With this, it is possible to prevent a situation in which the SOC of the first battery decreases with fluctuation of the generated voltage of the alternator.

In the electric power supply system for a vehicle of this embodiment, when the voltage fluctuation request is received, it is determined whether or not the electric power supply system for a vehicle is in a situation capable of calculating the internal resistance. With this, in a case where there is another request given priority, it is possible to control the generated voltage of the alternator based on another request given priority.

In the first embodiment, an electric power supply system for a vehicle which is applied to a non-hybrid vehicle has been described. In contrast, in a second embodiment, an electric power supply system for a vehicle which is applied to a hybrid vehicle or an electric vehicle (hereinafter, referred to as hybrid vehicle or the like) will be described.

Figure 8:
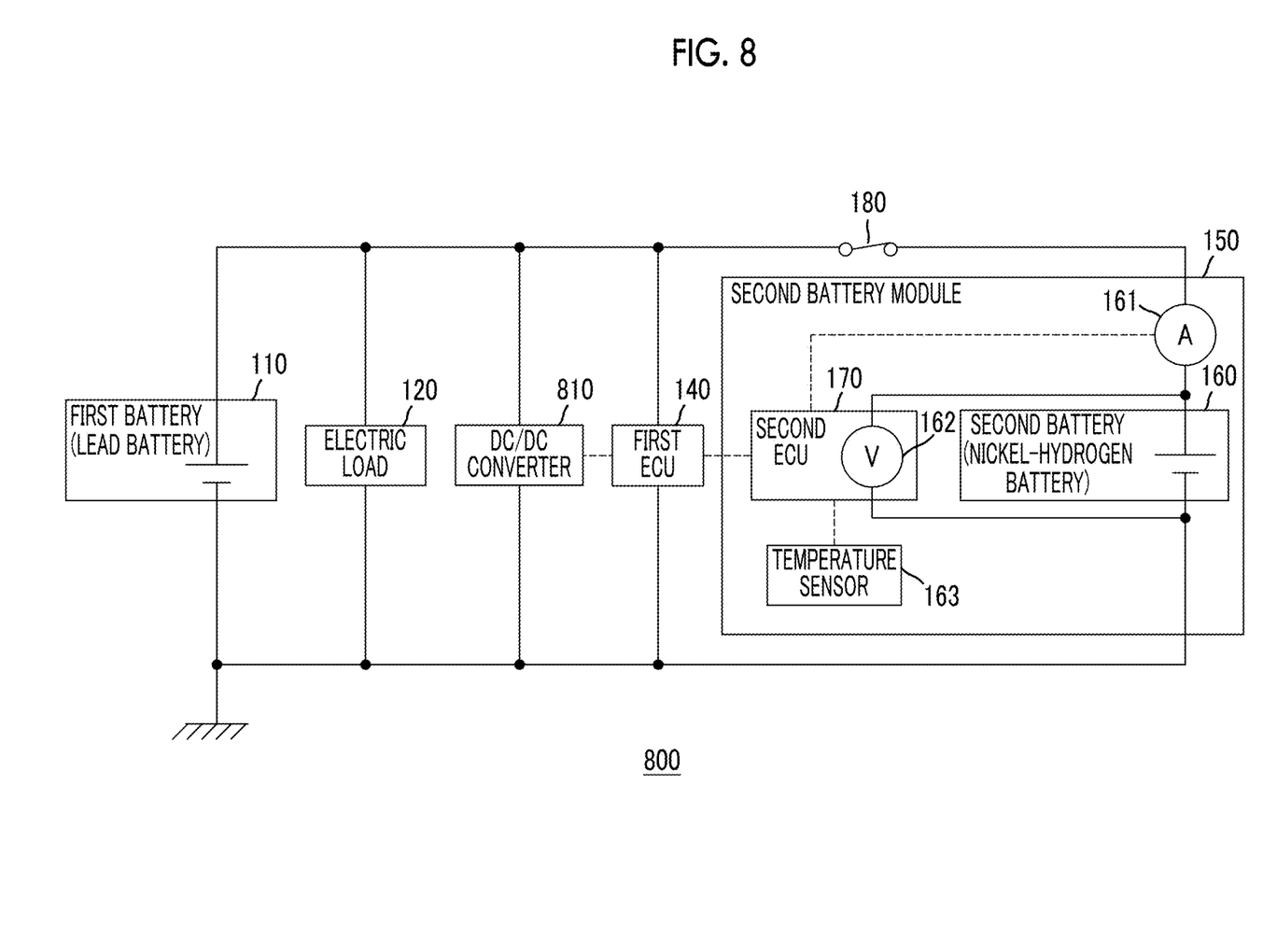
FIG. 8 is a diagram showing another configuration example of an electric power supply system for a vehicle.

FIG. 8 is a diagram showing another configuration example of an electric power supply system for a vehicle. An electric power supply system 800 for a vehicle shown in FIG. 8 is an electric power supply system for a vehicle which supplies electric power to an electric load mounted in a vehicle, and is an electric power supply system which is applied to, for example, a hybrid vehicle.

A difference from the electric power supply system 100 for a vehicle shown in FIG. 1 is that, in a case of FIG. 8, a DC/DC converter 810 is provided instead of the alternator 130.

The DC/DC converter 810 is a deboosting device which charges the first battery 110 and the second battery 160 having a low voltage (for example, 12 [V]) based on electric power supplied from a high-voltage battery (not shown).

The first ECU 140 controls an output voltage of the DC/DC converter 810 such that the output voltage of the DC/DC converter 810 fluctuates according to a predetermined voltage waveform. With this, the second ECU 170 can calculate the internal resistance of the second battery 160 with high reproducibility and high accuracy.

In the first and second embodiments, a case where a control target (alternator 130 or DC/DC converter 810) for realizing voltage fluctuation and current fluctuation of the second battery is connected in parallel with the second battery 160 has been described.

In contrast, in a third embodiment, a case where a control target for realizing voltage fluctuation and current fluctuation of the second battery is connected in series with the second battery 160 will be described.

Figure 9:
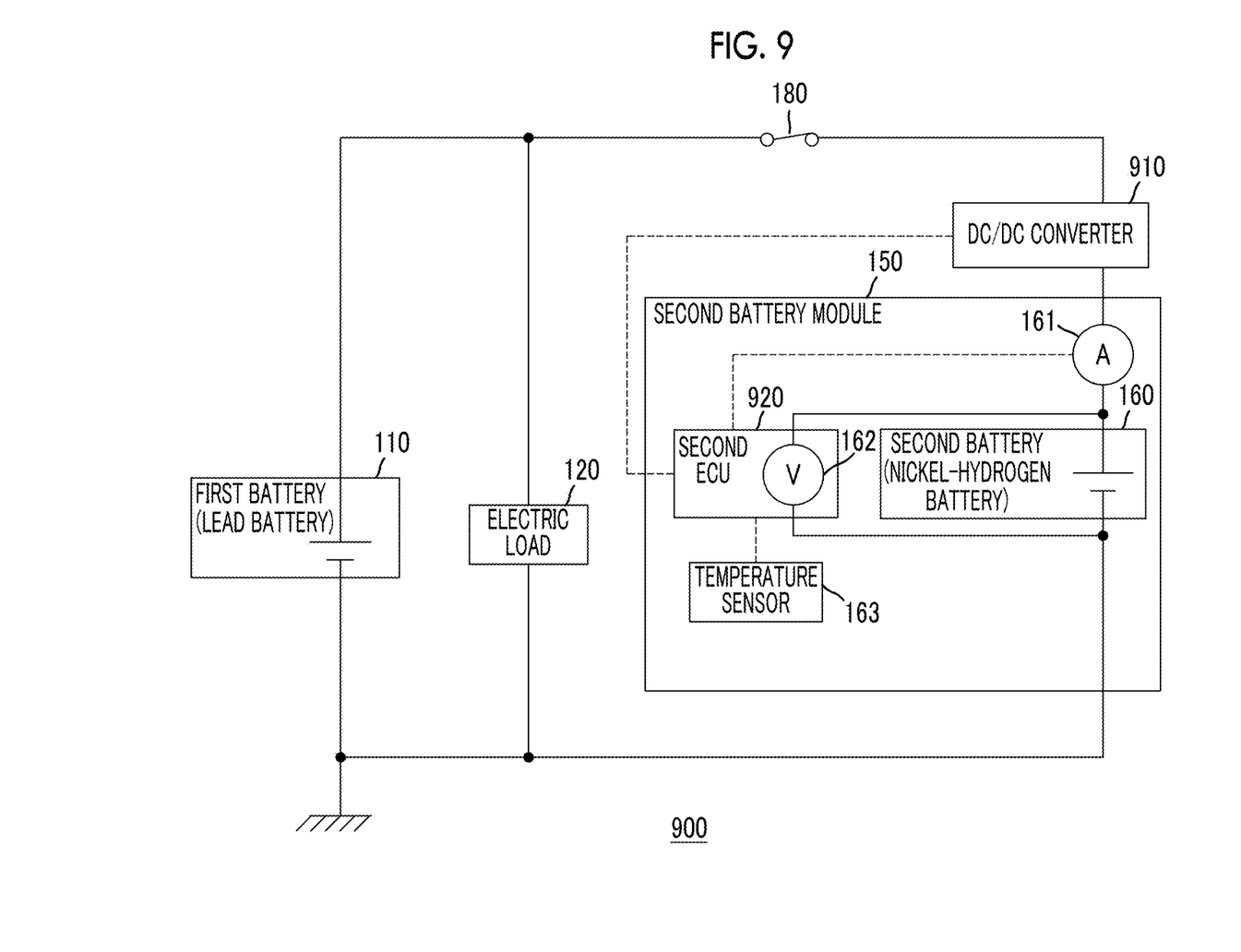
FIG. 9 is a diagram showing another configuration example of an electric power supply system for a vehicle.

FIG. 9 is a diagram showing another configuration example of an electric power supply system for a vehicle. An electric power supply system 900 for a vehicle shown in FIG. 9 is an electric power supply system for a vehicle which supplies electric power to an electric load mounted in a vehicle, and is an electric power supply system which is applied to, for example, a hybrid vehicle or the like.

As shown in FIG. 9, in a case of the electric power supply system 900 for a vehicle, a DC/DC converter 910 which is a control target for realizing voltage fluctuation and current fluctuation of the second battery is connected in series with the second battery 160.

In the electric power supply system 900 for a vehicle shown in FIG. 9, it is assumed that a second ECU 920 has a function of the first ECU 140, in addition to the function of the second ECU 170 described in the first embodiment.

The second ECU 920 makes an output voltage of the DC/DC converter 910 fluctuate according to a predetermined voltage waveform. With this, according to the electric power supply system 900 for a vehicle, it is possible to calculate the internal resistance of the second battery 160 with high reproducibility and high accuracy.

In the first to third embodiments, in generating the voltage waveform based on the upper limit voltage value, the lower limit voltage value, and the voltage fluctuation rate value, the voltage waveform is generated such that the voltage of the control target is made fluctuate toward the lower limit voltage value and is then made fluctuate toward the upper limit voltage value. However, the order of fluctuation is not limited thereto. For example, the voltage waveform may be generated such that the voltage of the control target is first made fluctuate toward the upper limit voltage value, and is then made fluctuate toward the lower limit voltage value.

In the first to third embodiments, although the internal resistance of the second battery 160 is calculated to calculate the deterioration degree of the second battery 160, for example, the internal resistance of the second battery 160 may be calculated to calculate the ability of the second battery 160. With this, it is possible to determine what kind of electric load can be operated with the current ability of the second battery 160.

In the first to third embodiments, in calculating the internal resistance of the second battery 160, the timing of bringing the relay 180 into the ON state has not been particularly described. However, the timing of bringing the relay 180 into the ON state is, for example, timing at which the request unit 311 transmits the voltage fluctuation request. Alternatively, the timing of bringing the relay 180 into the ON state may be timing at which the determination unit 301 determines that the electric power supply system for a vehicle is in a situation capable of calculating the internal resistance.

What is claimed is:

1. An electric power supply apparatus comprising:
    a first battery connected to supply electric power to an electric load mounted in a vehicle;
    a second battery connected to a DC/DC converter, configured to be charged with electric power supplied from the DC/DC converter and to supply electric power to an electric load mounted in the vehicle;
    a current sensor configured to detect a current value of the second battery;
    a voltage control unit configured to make a voltage of the DC/DC converter fluctuate according to a predetermined voltage waveform in a case where a predetermined condition is satisfied; and
    a derivation unit configured to derive internal resistance of the second battery based on the current value of the second battery detected by the current sensor while the voltage control unit is making the voltage of the DC/DC converter fluctuate according to the predetermined voltage waveform.

2. The electric power supply apparatus according to claim 1, further comprising a
    determination unit configured to determine whether or not the electric power supply apparatus is in a situation capable of making the voltage of the DC/DC converter fluctuate according to the predetermined voltage waveform,
        wherein the voltage control unit is configured to make the voltage of the DC/DC converter fluctuate according to the predetermined voltage waveform when the determination unit determines that the electric power supply apparatus is in a situation capable of making the voltage of the DC/DC converter fluctuate according to the predetermined voltage waveform.

3. The electric power supply apparatus according to claim 1, wherein the predetermined voltage waveform is generated based on an upper limit voltage value for preventing the first battery from being over charged and a lower limit voltage value for suppressing a decrease in charging rate of the first battery.

4. The electric power supply apparatus according to claim 3, wherein the predetermined voltage waveform changes from the upper limit voltage value to the lower limit voltage value.

5. The electric power supply apparatus according to claim 1, wherein:
    the voltage control unit is configured to make the voltage of the DC/DC converter repeatedly fluctuate in the same form as the predetermined voltage waveform; and
    the derivation unit is configured to derive the internal resistance of the second battery each time the control unit makes the voltage of the alternator or the DC/DC converter repeatedly fluctuate in the same form as the predetermined voltage waveform.

6. The electric power supply apparatus according to claim 1, further comprising a deterioration degree estimation unit configured to estimate a deterioration degree based on the internal resistance derived by the derivation unit.

7. The electric power supply apparatus according to claim 6, further comprising an alarming unit configured to output an alarm when the deterioration degree is equal to or greater than a threshold.

8. An electric power supply method comprising:
    making a voltage of a DC/DC converter fluctuate according to a predetermined voltage waveform in a case where a predetermined condition is satisfied; and
    deriving internal resistance of a battery based on a current value of the battery while making the voltage of the DC/DC converter fluctuate according to the predetermined voltage waveform, the battery connected to the DC/DC converter, configured to be charged with electric power supplied from the DC/DC converter and to supply electric power to an electric load mounted in a vehicle.

* * * * *